United States Patent
Lyashevsky et al.

(10) Patent No.: US 9,367,372 B2
(45) Date of Patent: Jun. 14, 2016

(54) SOFTWARE ONLY INTRA-COMPUTE UNIT REDUNDANT MULTITHREADING FOR GPUS

(71) Applicant: Advanced Micro Devices, Inc., Sunnyvale, CA (US)

(72) Inventors: Alexander Lyashevsky, Cupertino, CA (US); Sudhanva Gurumurthi, Watertown, MA (US); Vilas Sridharan, Brookline, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 223 days.

(21) Appl. No.: 13/920,574

(22) Filed: Jun. 18, 2013

(65) Prior Publication Data

US 2014/0368513 A1    Dec. 18, 2014

(51) Int. Cl.
| | |
|---|---|
| *G06F 9/38* | (2006.01) |
| *G06F 9/52* | (2006.01) |
| *G06F 11/00* | (2006.01) |
| *G06F 11/16* | (2006.01) |

(52) U.S. Cl.
CPC .............. *G06F 11/00* (2013.01); *G06F 9/3851* (2013.01); *G06F 9/52* (2013.01); *G06F 11/1633* (2013.01); *G06F 2201/825* (2013.01); *G06F 2201/83* (2013.01)

(58) Field of Classification Search
None
See application file for complete search history.

(56) References Cited

U.S. PATENT DOCUMENTS

| | | | |
|---|---|---|---|
| 6,499,048 B1 * | 12/2002 | Williams | 718/102 |
| 7,865,770 B2 * | 1/2011 | Quach | 714/11 |
| 2002/0116662 A1 | 8/2002 | Hofstee et al. | |
| 2002/0174318 A1 | 11/2002 | Stuttard et al. | |
| 2004/0153921 A1 | 8/2004 | Lee et al. | |
| 2005/0138485 A1 | 6/2005 | Osecky et al. | |
| 2005/0147048 A1 | 7/2005 | Haehn | |
| 2005/0246581 A1 | 11/2005 | Jardine et al. | |
| 2006/0117300 A1 * | 6/2006 | Puthukattukaran et al. | 717/124 |
| 2006/0150186 A1 | 7/2006 | Grayver | |
| 2006/0156127 A1 | 7/2006 | Harter et al. | |
| 2006/0230315 A1 | 10/2006 | Moyer | |
| 2007/0106986 A1 * | 5/2007 | Worley | G06F 9/45537 718/1 |
| 2008/0008393 A1 | 1/2008 | Stuttard et al. | |
| 2008/0196037 A1 | 8/2008 | Ple et al. | |
| 2009/0249034 A1 | 10/2009 | Sato et al. | |
| 2010/0169693 A1 | 7/2010 | Mukherjee et al. | |
| 2012/0317576 A1 | 12/2012 | Mueller et al. | |
| 2014/0068620 A1 * | 3/2014 | Factor | G06F 9/5027 718/102 |

\* cited by examiner

*Primary Examiner* — Joni Richer
(74) *Attorney, Agent, or Firm* — Volpe and Koenig, P.C.

(57) ABSTRACT

A system, method and computer program product to execute a first and a second work-item, and compare the signature variable of the first work-item to the signature variable of the second work-item. The first and the second work-items are mapped to an identifier via software. This mapping ensures that the first and second work-items execute exactly the same data for exactly the same code without changes to the underlying hardware. By executing the first and second work-items independently, the underlying computation of the first and second work-item can be verified. Moreover, system performance is not substantially affected because the execution results of the first and second work-items are compared only at specified comparison points.

22 Claims, 5 Drawing Sheets

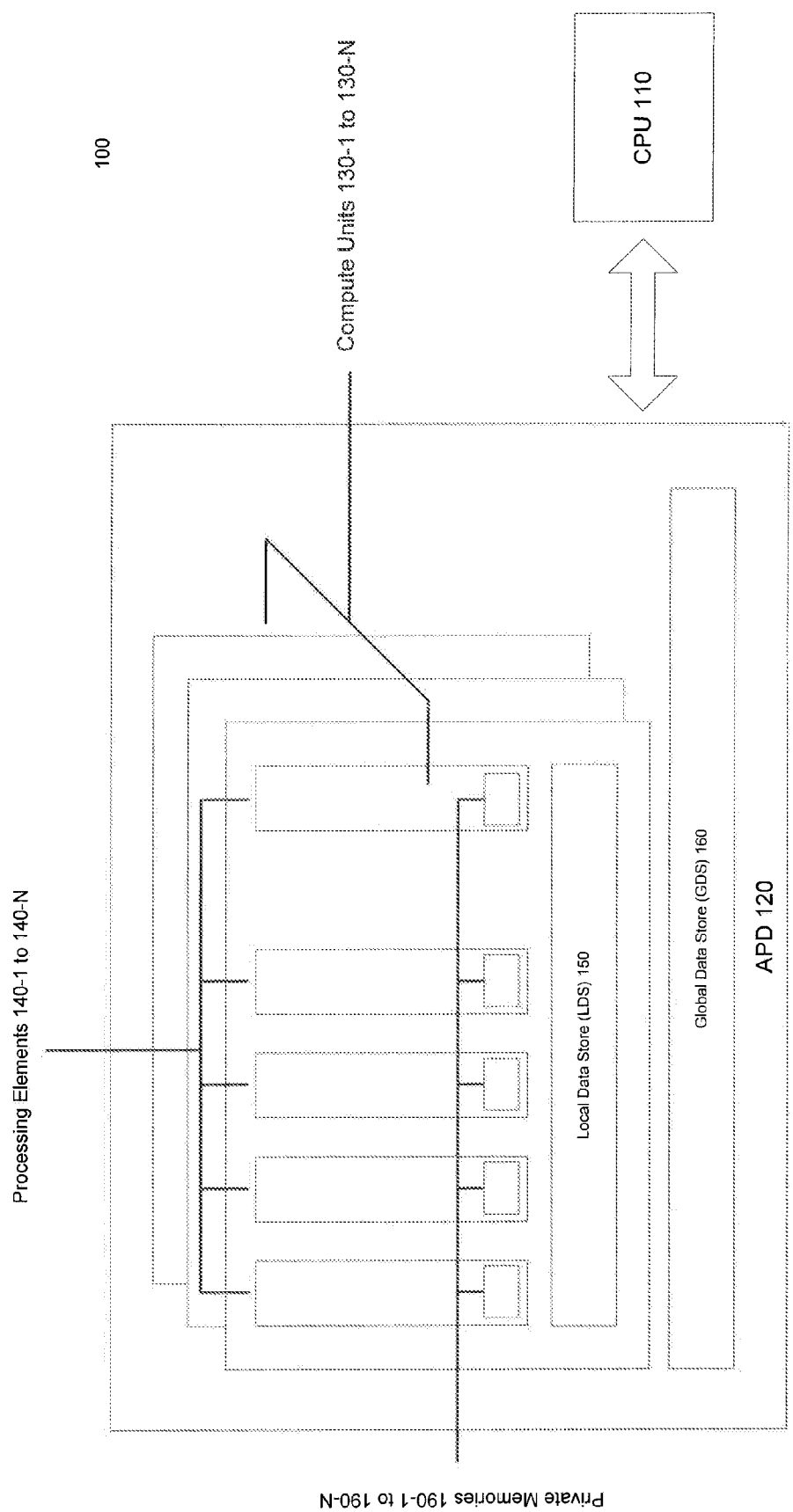
FIG. 1-A

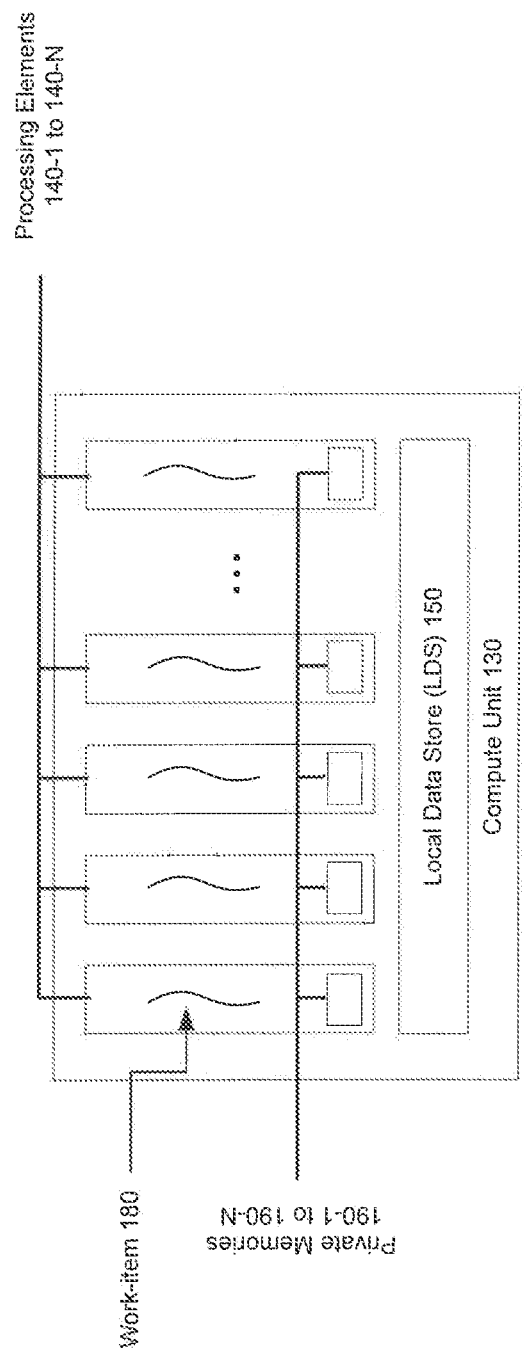
FIG. 1-B

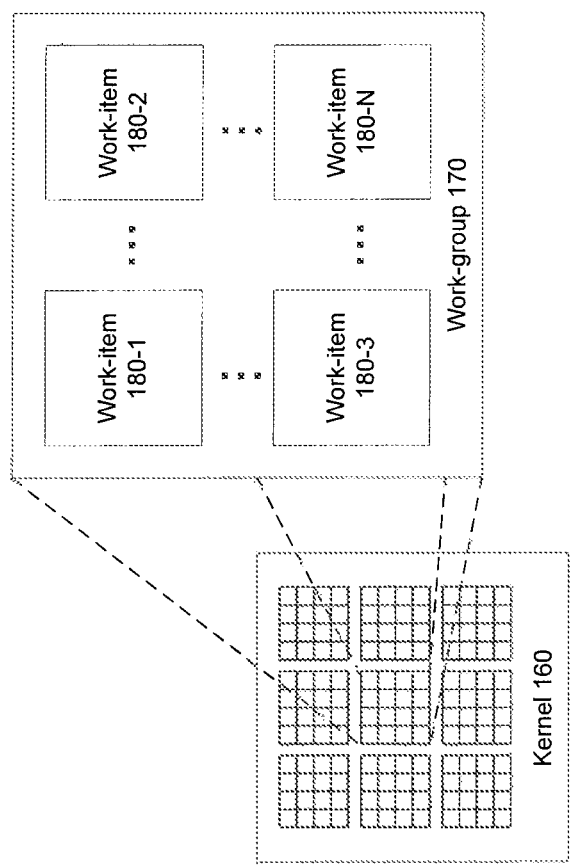
FIG. 1-C

SOFTWARE ONLY INTRA-COMPUTE UNIT REDUNDANT MULTITHREADING FOR GPUS

STATEMENT REGARDING FEDERALLY-SPONSORED RESEARCH AND DEVELOPMENT

This invention was made with Government support under Prime Contract Number DE-AC52-07NA27344, Subcontract Number B600716 awarded by DOE. The Government has certain rights in this invention.

CROSS REFERENCE TO RELATED APPLICATIONS

This application is related to U.S. Patent Application entitled "Software Only Inter-Compute Unit Redundant Multithreading for GPUs", filed on Jun. 18, 2013, which is incorporated by reference herein in its entirety.

BACKGROUND

1. Field

The present disclosure is generally directed to computing systems. More particularly, the present disclosure is directed to redundant multithreading within a computing system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available only for the acceleration of graphics. These constraints arose from the fact that GPUs did not have as rich a programming ecosystem as CPUs. Their use, therefore, has been mostly limited to two dimensional (2-D) and three dimensional (3-D) graphics and a few leading edge multimedia applications, which are already accustomed to dealing with graphics and video application programming interfaces (APIs).

With the advent of multi-vendor supported OpenCL® and DirectCompute®, standard APIs and supporting tools, GPU use has been extended beyond traditional graphics. Although OpenCL and DirectCompute are a promising start, there are many hurdles remaining to creating an environment and ecosystem that allows the combination of the CPU and GPU to be used as fluidly as the CPU for most programming tasks.

One hurdle remaining is to ensure high reliability when performing general purpose computations on a GPU. For example, use of a GPU in High Performance Computing (HPC) systems requires that the hardware be sufficiently reliable to tolerate faults without causing application errors or system crashes. Thus, in order to ensure high reliability, a mechanism is needed to perform redundant computation on the GPU.

Redundant multithreading (RMT) is one approach to improving reliability in high performance GPUs. RMT techniques must provide: (1) a method to ensure that redundant threads see the same load values from the memory subsystem; (2) a method to compare the outputs of redundant threads for correctness; and (3) a method to coalesce the outputs of redundant threads such that only one thread actually updates the memory subsystem.

Traditional RMT techniques require either comparing every instruction of a thread with its redundant copy or comparing every store of a thread with its redundant copy. These traditional approaches require significant changes to the GPU hardware architecture. Specifically, comparing every instruction or store in parallel requires a significant amount of additional hardware. In addition, these comparisons require the redundant threads to be synchronized. This is because the GPU hardware has limited resources to store one thread's instruction results while waiting for the redundant thread's identical instruction to complete execution. The resulting increase in hardware design complexity of the GPU means an increase in the cost and power requirements of the GPU. In addition, the instruction and store comparison incur a significant performance impact.

SUMMARY OF EMBODIMENTS

Embodiments include techniques to map a first and a second work-item of a plurality of work-items to the same identifier, accumulate write operations of the first and second work-items in signature variables and compare the signature variables at comparison points. This mechanism significantly reduces the cost and complexity of implementing redundant multithreading on a GPU. Specifically, the mechanism requires no additional GPU hardware resources and is transparent to the upper software layers. Moreover, the mechanism does not have a significant impact on performance because reliability checks can be flexibly inserted in any point in the computational flow and performed at a desired frequency. As a result, the mechanism allows maximum reuse of underutilized GPU resources for a given application while requiring minimal GPU resources and changes to upper software layers.

Embodiments described herein include a system, a computer-readable medium and a computer-implemented method for software only intra-compute unit redundant multithreading inside a GPU. Further features and advantages of the embodiments, as well as the structure and operation of the embodiments, are described in detail below with reference to the accompanying drawings. It is noted that the embodiments are not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the embodiments and to enable a person of ordinary skill in the relevant art to make and use the disclosed embodiments.

FIG. 1-A illustrates a block diagram of a unified computing system, according to an embodiment.

FIG. 1-B illustrates a block diagram of an execution model for the unified computing system, according to an embodiment.

FIG. 1-C illustrates an organization of a kernel that executes on the unified computing system, according to an embodiment.

DETAILED DESCRIPTION

Figure 2:
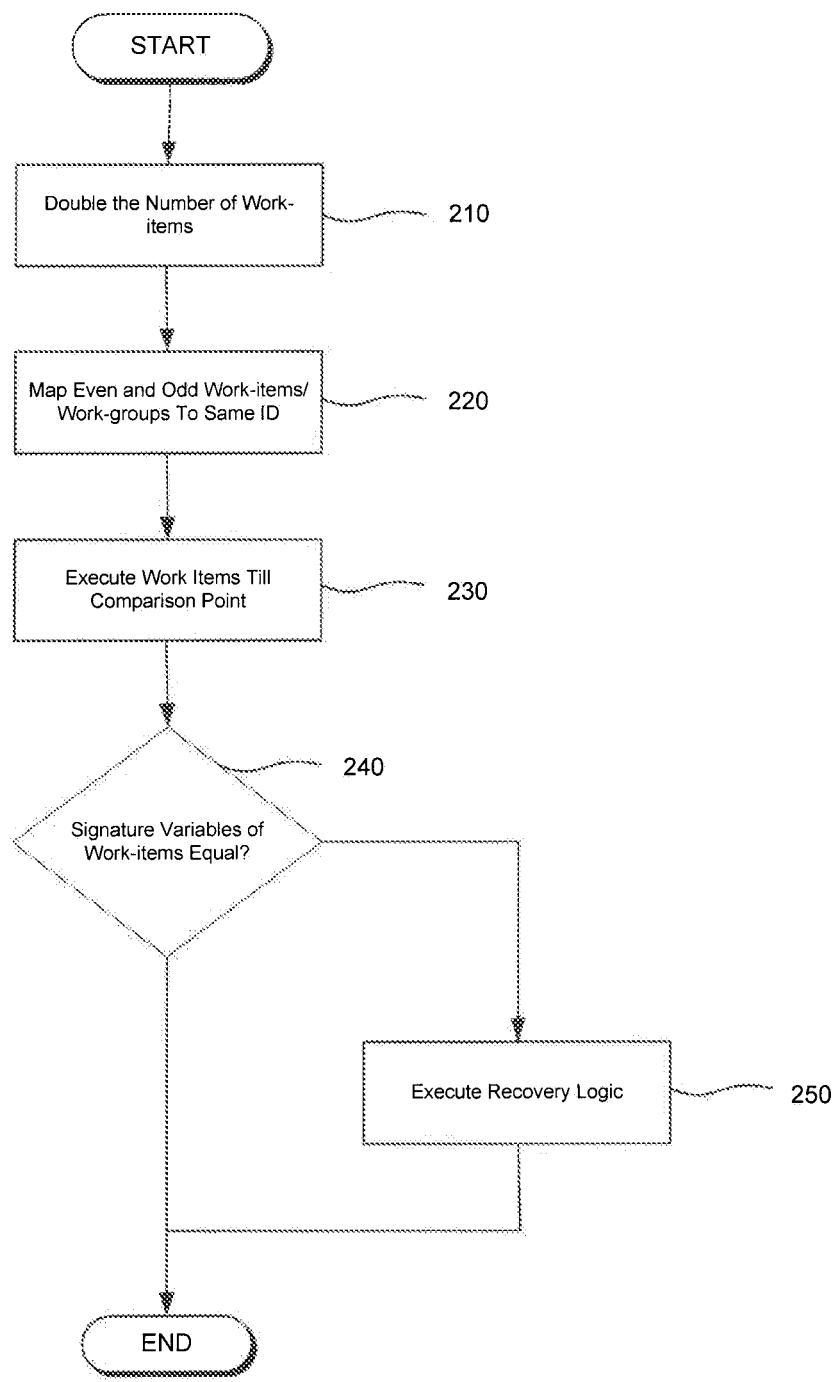
FIG. 2 illustrates a flowchart of an exemplary method 400 for performing intra-compute unit redundant multithreading, according to an embodiment.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the embodiments, and well-known elements of the embodiments may not be described in detail or may be omitted so as not to obscure the relevant details of the embodiments. In addition, the terminology used herein is for the purpose of describing particular embodiments only and is not intended to be limiting of the embodiments. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1-A is an exemplary illustration of a unified computing system 100 including two processors, a Central Processing Unit (CPU) 110 and an Accelerated Processing Device (APD) 120. CPU 110 can include one or more single or multi core CPUs. APD 120 refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof. Although GPUs, accelerated processing units (APUs), and general purpose use of the graphics processing unit (GPGPU) are commonly used terms in this field, the expression "accelerated processing device (APD)" is considered to be a broader expression.

In one embodiment, the system 100 is formed on a single silicon die or package, combining CPU 110 and APD 120 to provide a unified programming and execution environment. This environment enables the APD 120 to be used as fluidly as the CPU 110 for some programming tasks. However, it is not an absolute requirement that the CPU 110 and APD 120 be formed on a single silicon die. In some embodiments, it is possible for then, to be formed separately and mounted on the same or different substrates.

CPU 110 can include one or more of a control processor, field programmable gate array (FPGA), application specific integrated circuit (ASIC), or digital signal processor (DSP). CPU 110, for example, executes the control logic, including the operating system and programs, that control the operation of computing system 100. In this illustrative embodiment, CPU 110, according to one embodiment, initiates and controls the execution of a program by, for example, distributing the processing associated with the program across the CPU 110 and other processing resources, such as the APD 120. Specifically, programs are divided into two parts: one that executes on the APD 120 and another that executes on the CPU 110.

APD 120, among other things, executes a kernel. The kernel is the part of the program that executes on APD 120. Specifically, the kernel performs graphics operations and other operations that may be, for example, particularly suited for parallel processing. In general, APD 120 can be frequently used for executing graphics pipeline operations, such as pixel operations, geometric computations, and rendering an image to a display. In various embodiments, APD 120 can also execute compute processing operations (e.g., those operations unrelated to graphics such as, for example, video operations, physics simulations, computational fluid dynamics, etc.), based on a kernel received from CPU 110.

In an illustrative embodiment, CPU 110 transmits a kernel to APD 120. This kernel can include graphics operations and other operations amenable to parallel execution. This kernel, which can also include compute processing operations, can be executed substantially independently from CPU 110.

In order to execute a kernel, APD 120 includes one or more compute units 130, such as, but not limited to, one or more Single Instruction Multiple Data (SIMD) processing cores. As referred to herein, compute unit 130 is a pipeline, or programming model, where respective instantiations of the same kernel are executed concurrently. Each compute unit 130 is composed of one or more processing elements 140 and a local data store (LDS) 150.

Each processing element 140 in a compute unit 130 executes a respective instantiation of the same kernel. An instantiation of a kernel, along with its associated data, is called a work-item or thread. Thus, a kernel is the code for a work-item, and a work-item is the basic unit of work on APD 120. By way of example, FIG. 1-B illustrates the execution of a work-item 180 on a processing element 140 of a compute unit 130.

Each processing element 140 has a private memory 190. Each processing element 140 stores per work-item data in the private memory 190. This private memory 190 is not visible to work-items executing on other processing elements 140. This private memory 190 may be implemented with various memory technologies including, but not limited to, dynamic random access memory (DRAM), embedded dynamic random access memory (eDRAM), phase change memory (PCM), and the like.

In addition, each compute unit 130 includes a LDS 150. LDS 150 is a memory that is accessible to each processing element 140 in a compute unit 130. Thus, LDS 150 enables work-items executing on a compute unit 130 to share data between each other. LDS 150 may be implemented with various memory technologies including, but not limited to, dynamic random access memory (DRAM), embedded dynamic random access memory (eDRAM), phase change memory (PCM), and the like.

All instantiations of a kernel executing on compute units 130 comprise a global domain of work-items. This global domain of work-items can represent the entire computation domain, and a work-item within the computation domain represents a particular task to performed. For example, FIG.

1-C illustrates a kernel 160 comprising a global domain of work-items 180-1 through 180-N.

In order to simplify execution of work-items on APD 120, work-items are grouped together into work-groups. A work-group is a collection of related work-items that execute together on a single compute unit 130. For example, FIG. 1-C illustrates a work-group 170 comprising a collection of related work-items 180-1 through 180-N.

A work-item in a work-group executes the same kernel but with different data. A work-group has a local size that defines the number of work-items in the work-group and a group ID that uniquely identifies the work-group from other work-groups. For example, work-group 170 in FIG. 1-C has a local size of N.

A benefit of grouping work-items into work-groups is that the work-items in a work-group are synchronized. This is because a work-group consists of several wavefronts. A wavefront is a hardware entity and is not visible at the software level. A set of work-items in a wavefront share a program counter and are executed together. Specifically, the processing elements 140 of a compute unit 130 execute the work-items of a wavefront, line by line, together. This results from the fact that although each processing element 140 can perform basic arithmetic and logical operations, scheduling operations are performed solely by the compute unit 130.

The execution of related work-items in a work-group on a single compute unit 130 is referred to as intra-computation. In contrast, the execution of related work-items in different work-groups on different compute units 130 is referred to as inter-computation. The inter-computing approach causes synchronization issues when work-items on different compute units 130 have to share data. This is because work-items in different work-groups on the different compute units 130 are executed independently of each other.

In order to account for these issues during inter-computation, in an exemplary embodiment, work-items in different work-groups communicate with each other through a global data share (GDS) 160 on APD 120 using synchronization primitives.

GDS 160 is a memory that is visible and accessible to each compute unit 130. In addition, GDS 160 is visible and accessible to CPU 110. Thus, GDS 160 enables work-items executing on a different compute units 130 to share data between each other. GDS 160 may be implemented with various memory technologies including, but not limited to, dynamic random access memory (DRAM), embedded dynamic random access memory (eDRAM), phase change memory (PCM), and the like.

A work-item executing on a processing element 140 is distinguished from other work-items within the same and different work-groups by its global ID and local ID. The global ID identifies the work-item globally across all the work-items in all the work-groups (i.e. the global domain of work-items). Furthermore, global ID indicates the specific data that is be processed by a work-item. Specifically, the global ID is used to compute memory addresses and make control decisions for a work item. The local ID, on the other hand, identifies a work-item within a given work-group.

A person of skill in the art will understand, upon reading this description, that computing system 100 can include more or fewer components than shown in FIG. 1-A.

FIG. 2 is a flowchart of an exemplary method 200 illustrating the sequence of operations performed for both intra-compute unit and inter-compute unit redundant multithreading, according to embodiments. Intra-compute unit redundant multithreading is directed to redundant computation using work-items in the same work-group executing on a single compute unit 130. Inter-compute unit redundant multithreading is directed to redundant computation using related work-items in two different work-groups executing on two different compute units 130. Except where noted, method 200 covers both intra-compute unit and inter-compute unit redundant multithreading.

Flowchart 200 includes operations 210 through 250. It is to be appreciated that not all steps may be required nor performed in the order described. Code samples are discussed with reference to the OpenCL programming framework. However, it is to be appreciated that other programming frameworks may be used to implement embodiments herein.

In operation 210, the global work-item domain is at least doubled. In the case of intra-compute unit redundant multithreading, this at least doubles the number of work-items to be executed in a work-group. In other words, the local work-group size is at least doubled. In the case of inter-compute unit redundant multithreading, this at least doubles the number of work-groups to be executed.

Specifically, prologue code is added to the beginning of the kernel code. The prologue code's instructions are then executed which at least doubles the global domain of work-items. As would be appreciated by a person of ordinary skill in the art, the prologue code may generated automatically by a compiler or inserted manually by a kernel programmer.

While the number of work-items in the global domain of work-items is at least doubled, the runtime software stack continues to report the original size of the global domain of work-items to upper layers of software. In the case of intra-compute unit redundant multithreading, the runtime software stack continues to report the original local work-group size to upper layers of software. In the case of inter-compute unit redundant multithreading, the runtime software stack continues to report the original number of work-groups to upper layers of software.

In an embodiment, the transparent reporting of the original size of the global domain of work-items, the original local work-group size, and the original number of work-groups is performed by replacing various system calls. For example, in the OpenCL programming framework, the get_global_size( ), get_local_size( ) and get_num_groups( ) functions are replaced.

In the case of intra-compute unit redundant multithreading, because the global domain of work-items is doubled, a redundant work-item can be executed for each work-item in a work-group in order to improve reliability. Alternatively, in the case of inter-compute unit redundant multithreading, a redundant work-group can be executed for each work-group in order to improve reliability.

As discussed above, a work-item has a global ID which uniquely identifies the work-item amongst all work-items in the global domain. A work-item also has a local ID which uniquely identifies the work-item in a work-group. Furthermore, a work-group has a group ID which uniquely identifies the work-group amongst all work-groups. A work-item's global ID can be computed from its local ID and its work-group's group ID.

The global ID, or alternatively the local ID and group ID, indicate the specific data to be processed by the work-item. In other words, the global ID is used to compute memory addresses and make control decisions for the work-item.

In operation 220, a mapping relationship is established in order to perform redundant computation. In the case of intra-compute unit redundant multithreading, two adjacent work-items in the same work-group are mapped to the same global ID and local ID such that the two work-items execute the same kernel code for the same data. For example, work-items with original global IDs of 0 and 1 respectively are both mapped to global ID 0.

In the case of inter-compute unit redundant multithreading, two adjacent work-groups are mapped to the same group ID such that the two work-groups execute the same computation. For example, work-groups with original group IDs of 0 and 1 respectively are both mapped to group ID 0.

In an embodiment for intra-compute unit redundant multithreading, the mapping of the two work-items to the same global and local IDs is performed by replacing various system calls. In the OpenCL programming framework, the get_global_id( ) and get_local_id( ) functions are replaced. For example, as would be appreciated by a person of ordinary skill in the art, the get_global_id( ) function may be replaced with the following code:

```
inline unit rr_intra_get_global_id(uint dim)
{
    // divide the actual global ID by 2
    // maps the even/odd work-items to the same
    global ID
        return (get_global_id(dim) >> 1);
}
```

As a result of the mapping, there are two work items (i.e. an even and an odd work-item) that map to the same global and local IDs through system calls. Because the even and odd work-items have the same global and local IDs, redundant computation can be performed. Specifically, the same global and local IDs means that both the even and odd work-items fetch exactly the same data and execute exactly the same code.

In order to perform the redundant computation, the even and odd work-items are executed on different processing elements 140 in the same compute unit 130. Accordingly, the results produced by the even and odd work-items can be compared to ensure that there was a correct computation.

Similarly, in an embodiment for inter-compute unit redundant multithreading, the mapping of the two work-groups (i.e. an even and an odd work-group) to the same group ID is performed by replacing various system calls. In the OpenCL programming framework, the get_group_id( ), get_global_size( ), get_global_id and similar functions are replaced. For example, as would be appreciated by a person of ordinary skill in the art, the get_global_id( ) function may be replaced with the following code:

```
inline unit get_global_id(uint dim)
{
    return (rr_inter_get_group_id(dim) *
get_local_size(dim) + get_local_id(dim));
}
cu_global_group_id = cu_scheduledgroups_total++; //
atomic operation
inline uint rr_inter_get_group_id(uint dim)
{
    return (cu_global_group_id * (number_CUs >> 1)
+ (CU_id >> 1));
}
```

In order to implement the above code, two system variables per compute unit 130 are required, cu_scheduledgroups_total and cu_global_group_id. Both variables are allocated in GDS 160 and set to 0 at the start of the execution of the kernel. cu_scheduledgroups_total is a counter of all the work-groups scheduled on a particular compute unit 130. cu_global_ group_id is an index of a work-group per compute unit 130. cu_global_group_id ranges from 0 to (cu_scheduledgroups_total−1).

In addition, cu_num_groups is a compile time constant that represents the number of work-groups scheduled per compute unit 130. number_CUs is a system-wide constant that represents the number of compute units 130 in the APD 120. CU_id is an identifier for a given compute unit 130.

Together with these variables and constants, the rr_inter_get_group_id function guarantees a round robin group ID assignment for work-items independent of the actual hardware assignment and scheduling. Moreover, it guarantees that for each work-group scheduled for execution on an even compute unit 130 there will be a matching work-group available on an odd compute unit 130.

As a result of the mapping, there are two work-groups (i.e. an even and an odd work-group) that map to the same group ID through a system call. Similarly, the get_global_id function ensures that corresponding work-items in the two work-groups map to the same global ID. Because the even and odd work-groups have the same group ID, and corresponding work-items therein have the same global ID, redundant computation can be performed. Specifically, the same group ID means that both the even and odd work-groups, by way of their included work-items, fetch exactly the same data and execute exactly the same code.

In order to perform the redundant computation, the even and odd work-groups are executed on different compute units 130. Accordingly, the results produced by the even and odd work-groups can be compared to ensure that there was a correct computation.

In operation 230, redundant computation is performed. In the case of intra-compute unit redundant multithreading, the even and odd work-items are executed on their separate processing elements 140 until a comparison point is reached in the kernel code. A comparison point is a point in the kernel code where a reliability check is made to verify that the even and odd work-items produced the same result for the same data using the same code at that specific point. As would be appreciated by a person of ordinary skill in the art, a comparison point may be setup either automatically by a compiler or manually by a programmer. In addition, multiple comparison points may be specified in the kernel code in order to balance reliability and performance.

Because the even and odd work-items are part of a common work-group, they're executed concurrently on separate processing elements 140 in a single compute unit 130. Moreover, the even and odd work-items are executed line by line, together. Thus, there are minimal synchronization issues between the even and odd work items.

However, while execution of the even and odd work-items is synchronized, only one of them can execute write operations to the LDS 150 and or GDS 160. This is because even though both the even and odd work-items execute exactly the same code for exactly the same data, one of them may produce an incorrect result. Therefore, in an embodiment herein, only the even work-item executes write operations to the LDS 150 and or GDS 160. The odd work item does not execute write operations to the LDS 150 and or GDS 160.

Instead, in order to compare the results of the even and odd work-items at a comparison point, the even and odd work-items accumulate global and local writes in signature variables. In an embodiment, the accumulated global and local writes may be mapped to a data value of fixed length before storage in a signature variable. A hashing function, including but not limited to SHA1, MD4, and MD5, may be used to perform the mapping. Alternatively, the accumulated global and local writes may be stored in the signature variable as a cyclic redundancy check (CRC). The signature variable is stored in the private memory 190 of the processing element 140 executing the associated work-item.

Similarly, in the case of inter-compute unit redundant multithreading, the even and odd work-groups are executed on their separate compute units 130 until a comparison point is reached in the kernel code. Because the even and odd work-groups are executed on different compute units 130, their executions are not synchronized and they do not share a LDS 150. Rather the even and odd work-groups only share GDS 160. Moreover, only one of the even and odd work-groups can execute write operations to a LDS 150 and or GDS 160. This is because despite both the even and odd work-groups executing exactly the same code for exactly the same data, one of them may produce an incorrect result. Therefore, in an embodiment herein, only the even work-group executes write operations to its LDS 150 and or the GDS 160. The odd work-group does not execute write operations to its LDS 150 and or the GDS 160.

In order to compare the results of the even and odd work-groups at a comparison point, the even and odd work-groups accumulate global and local writes in signature variables. In an embodiment, the accumulated global and local writes may be mapped to a data value of fixed length before storage in a signature variable. A hashing function, including but not limited to SHA1, MD4, and MD5, may be used to perform the mapping. Alternatively, the accumulated global and local writes may be stored in the signature variable as a cyclic redundancy deck (CRC). The signature variable is stored in the private memory 190 of the processing element 140 executing the associated work-item. In other words, both the even and odd work-groups have multiple signature variables; one signature variable for each of their work-items.

In operation 240, the signature variables are compared. In the case of intra-compute unit redundant multithreading, the even and odd work-items are compared. Because the signature variables are stored in the private memories of processing elements 140, they cannot be compared directly. Accordingly, an intermediate comparison mechanism is needed.

In an embodiment for intra-compute unit redundant multithreading, a comparison point array is allocated on LDS 150. The comparison point array is associated with the work-group of the even and odd work-items. The comparison point array is an array of elements. Each element represents a signature variable. The number of elements is equal to the original local work-group size of the associated the work-group. The original local work-group size is the local work-group size before the at least doubling operation of operation 210.

The comparison point array is used to compare the even and odd work-item signature variables. Specifically, when the odd work-item reaches the comparison point during execution of the kernel code in operation 230, the odd work-item writes its signature variable into the comparison point array at an index derived from the local ID mapped to in operation 220. Immediately after the odd work-item writes to the comparison point array, the even work-item reads from the comparison point array at the written to index and compares the value therein to the signature variable of the even work-item. Because the even and odd work-items are executed together in a common work-group the reads and writes between them are synchronous.

If there is a mismatch between the even work-item signature variable and the comparison point array value, then recovery actions are executed in operation 250. Otherwise, the even and odd work-item signature variables match, and thus a reliable computation is ensured.

As would be appreciated by a person of ordinary skill in the art, in an embodiment for intra-compute unit redundant multithreading, operations 230 to 250 may be implemented in OpenCL code as follows below.

```
float signature;
// signature accumulation
// until this comparison point
// odd work-item
if ( get_global_id(0) & 1 )
{
    Local_comparisonpoint_array[rr_intra_get_local_
       id(0)] = signature;
}
// read/write within the same work-group are
synchronous
float rr_delta = 0;
// even work-item
if ( (get_global_id(0) & 1) == 0 )
{
    rr_delta =
    Local_comparisonpoint_array[rr_intra_get_local_
       id(0)] - signature;
    if ( rr_delta > threshold )
    {
        // recovery actions
    }
}
```

The intra-compute unit redundant multithreading of method 200 assumes that both even and odds work-items fetch exactly the same data and produce the same result. This assumption breaks, however, when inter work-item communication takes place.

In the case of inter-compute unit redundant multithreading, the even and odd work-groups are compared. Because the signature variables are stored in the private memories of processing elements 140, they cannot be compared directly. In addition, because the even and odd work-groups are executing on different compute units 130, a LDS 150 cannot be used to compare the signature variables. Accordingly, an intermediate comparison mechanism is needed. Furthermore, any comparison mechanism must account for the lack of synchronization between the even and odd work-groups.

In an embodiment for inter-compute unit redundant multithreading, the signature variables of the work-items within the even and odd work-groups may be compared via GDS 160. However, unlike intra-compute unit redundant multithreading, the signature variables must be written to and read from GDS 160 using a synchronization mechanism because the even and odd work-groups, and their work-items therein, are not synchronously executed. Otherwise the comparisons will be based on possibly incorrect data.

As would be appreciated by a person of ordinary skill in the art, various data passing mechanisms may be used to perform synchronized signature comparison. For example, the chosen data passing mechanisms may depend on the amount of memory available in GDS 160 and the latency requirements. In an embodiment, a spin-lock mechanism is used to synchronize data and message passing between the even and odd work-groups. For example, as would be appreciated by a person of ordinary skill in the art, the spin-lock mechanism may be implemented with the following code:

```
#define FREE 0
#define FILLED 1
```

```
#define LOCKED 2
_gds unsigned int rr_inter_wave_lock[4] = {0,0,0,0};
// producer code
bool is_producer = IsProducer( );
if (is_producer) {
    if ( get_wave_local_id(0) == First_Active_Lane( ) ) {
        // wait until the buffer is free and acquire
        the          // lock.
            while ( atomic_cmpxchg(
                    &rr_inter_wave_lock[wave_index],
                    FREE,
                    LOCKED) != FREE) { // spin }
        }
        // pass data
        Pass_Data_Over_Active_Lines( );
        if ( get_wave_local_id(0) == First_active_lane( ) ) {
            // signal that the buffer has been filled and
            // release the lock
            int filled = FILLED |
                    (rr_inter_get_group_id(0) << 24) |
                    (is_producer << 16); // unique key
                    per group and per data direction
            atomic_xchg(&rr_inter_wave_lock[wave_index],
                    filed);
        }
}
// consumer code
if ( !is_producer ) {
    if ( get_wave_local_id(0) == First_Active_Lane( ) ) {
        // wait until the buffer is filled an acquire
    the
            // lock.
            int filled = FILLED |
                    (rr_inter_get_group_id(0) << 24) |
                    (is_producer << 16); // unique key
                    // per group and per data
        direction
            while (atomic_cmpxchg(
                    &rr_inter_wave_lock[wave_index],
                    filed, LOCKED) != filed) { // spin }
        }
        // obtain data
        Obtain_Data_Over_Active_Lines( );
        if ( get_wave local_id(0) == First_Active_Lane( ) ) {
            // signal that the buffer is free and release
        the
            // lock
            atomic_xchg(&rr_inter_wave_lock[wave_index],
                    FREE);
        }
}
```

In the above code, IsProducer( ) is a function that defines whether the even or odd work-group is the data producer. Pass_Data_Over_Active_Lines( ) and Obtain_Data_Over_Active_Lines( ) pass and obtain data from GDS 160.

In an embodiment for inter-compute unit redundant multithreading, a buffer is allocated on GDS 160. The buffer stores signature variables.

The buffer is used to compare the signature variables of the work-items of the even and odd work-groups. Specifically, when a work-item in the odd work-group reaches the comparison point during execution of the kernel code in operation 230, the work-item writes its signature variable into the buffer. Thereafter, the corresponding work-item in the even work-group reads from the buffer and compares the value therein to its signature variable.

Because the even and odd work-groups are not executed synchronously, the reads and writes between work-items therein must be coordinated via a synchronization mechanism. For example, the spin-lock synchronization mechanism discussed above maybe used to coordinate reads and writes. Specifically, signature variable passing and data feeding may be performed using the Pass_Data_Over_Active_Lines and Obtain_Data_Over_Active_Lines functions.

If there is a mismatch between the even work-group signature variables and the signature variables stored in the buffer, then recovery actions are executed in operation 250. Otherwise, the even and odd work-group signature variables match, and thus a reliable computation is ensured.

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 3:
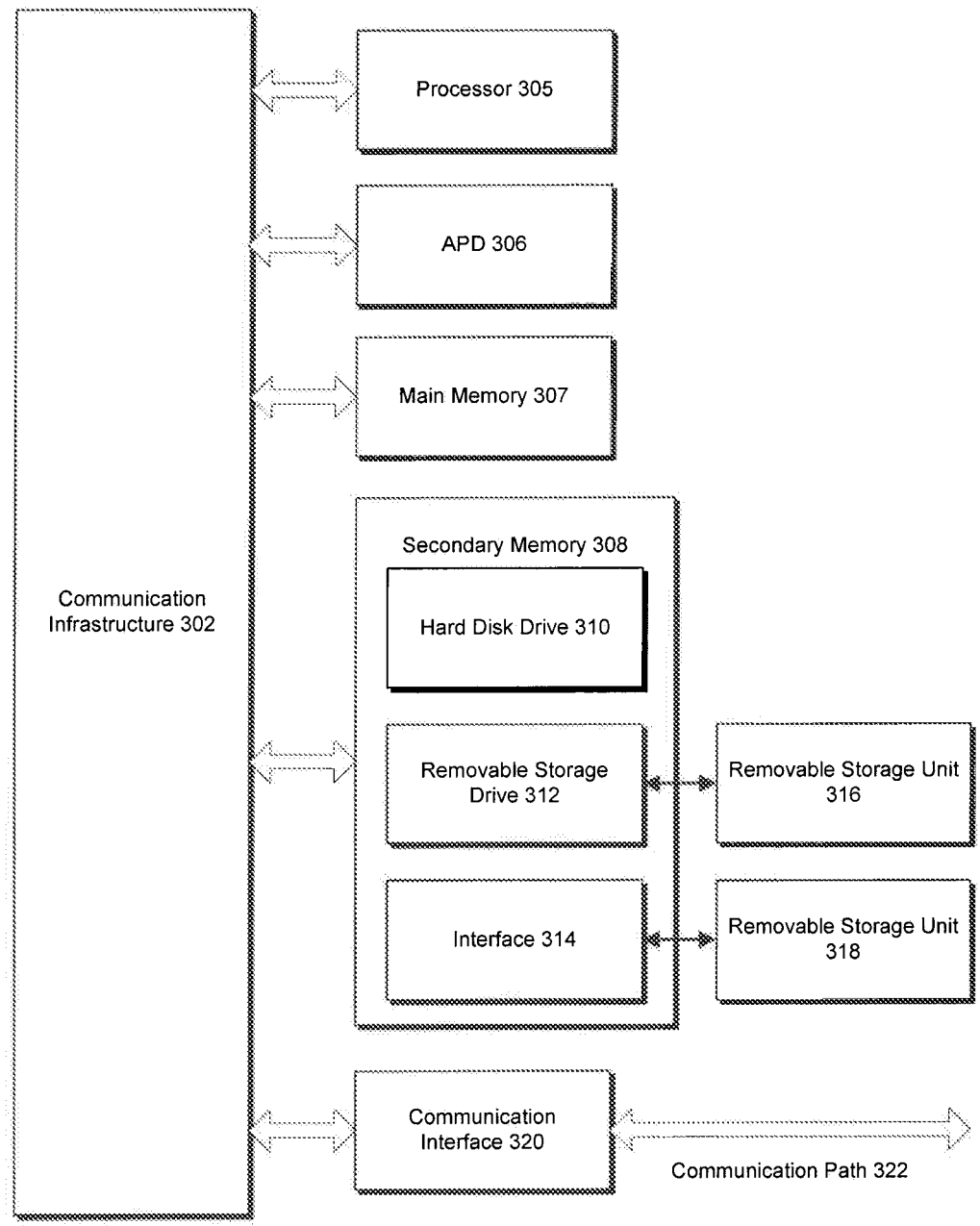
FIG. 3 illustrates a block diagram of an exemplary computer system on which the embodiments can be implemented

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 300 is shown in FIG. 3. The computer system 300 includes one or more processors, such as processor 304. Processor 304 can be a special purpose or a general purpose digital signal processor. The processor 304 is connected to a communication infrastructure 302 (for example, a bus or network). Various software implementations are described in terms of this exemplary computer system. After reading this description, it will become apparent to a person skilled in the relevant art how to implement the disclosure using other computer systems and/or computer architectures.

Computer system 300 also includes an Accelerated Processing Device (APD) 306 and a main memory 307 (e.g., random access memory (RAM)), and may also include a secondary memory 308. APD 306 is any cooperating collection of hardware that performs those functions and computations associated with accelerating graphics processing tasks, data parallel tasks, or nested data parallel tasks in an accelerated manner compared to conventional CPUs and conventional GPUs. APD 306 may be located outside of processor 304. Secondary memory 308 may include one or more of, for example, a hard disk drive 310 and/or a removable storage drive 312, representing a floppy disk drive, a magnetic tape drive, an optical disk drive, or the like. Removable storage drive 312 reads from and/or writes to a removable storage unit 316 in a well-known manner. Removable storage unit 316 represents a floppy disk, magnetic tape, optical disk, or the like, which is read by and written to by removable storage drive 312. As will be appreciated by persons skilled in the relevant art(s), removable storage unit 316 includes a computer usable storage medium having stored therein computer software and/or data.

In alternative implementations, secondary memory 308 may include other similar means for allowing computer programs or other instructions to be loaded into computer system 300. Such means may include, for example, a removable storage unit 318 and an interface 314. Examples of such means may include a program cartridge and cartridge interface (such as that found in video game devices), a removable memory chip (such as an EPROM, or PROM) and associated socket, a thumb drive and USB port, and another removable storage unit 318 and interface 314 which allow software and data to be transferred from removable storage unit 318 to computer system 300.

Computer system 300 may also include a communications interface 320. Communications interface 320 allows software and data to be transferred between computer system 300 and external devices. Examples of communications interface 320 may include a modem, a network interface (such as an Ethernet card), a communications port, a PCMCIA slot and card, etc. Software and data transferred via communications interface 320 are in the form of signals which may be electronic, electromagnetic, optical, or other signals capable of being received by communications interface 320. These signals are provided to communications interface 320 via a communications path 322. Communications path 322 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 316 and 318 or a hard disk installed in hard disk drive 310. These computer program products are means for providing software to computer system 300.

Computer programs (also called computer control logic) are stored in main memory 307 and/or secondary memory 308. Computer programs may also be received via communications interface 320. Such computer programs, when executed, enable the computer system 300 to implement the present disclosure as discussed herein. In particular, the computer programs, when executed, enable processor 304 to implement the processes of the present disclosure, such as any of the methods described herein. Accordingly, such computer programs represent controllers of the computer system 300. Where the disclosure is implemented using software, the software may be stored in a computer program product and loaded into computer system 300 using removable storage drive 312, interface 314, or communications interface 320.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The Summary and Abstract sections may set forth one or more but not all exemplary embodiments as contemplated by the inventor(s), and thus, are not intended to limit the embodiments and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system comprising:
    a processor including a plurality of compute units, each compute unit including a plurality of processing elements that is associated with that respective compute unit, each of the plurality of processing elements including a respective private memory that is associated exclusively with that processing element, configured to perform operations comprising:
    executing a first work-item on a first processing element and a second work-item on a second processing element, the first and second processing elements included on the same compute unit, wherein the first work-item performs first write operations to a first signature variable in the private memory of the first processing element, the first signature variable associated with one of a global or local identifier of the first work-item and the second work-item performs second write operations to a second signature variable in the private memory of the second processing element, the second signature variable associated with one of a global or local identifier of the second work-item; and
    comparing the first signature variable to the second signature variable at a comparison point.

2. The system of claim 1, wherein a plurality of work-items is at least doubled.

3. The system of claim 1, wherein comparing the first signature variable to the second signature variable at a comparison point further comprises:
    writing the second signature variable into a comparison point array in a local data store (LDS); and
    comparing the first signature variable to the comparison point array in the LDS.

4. The system of claim 1, wherein the processor is further configured to perform operations comprising:
    executing a recovery subsystem when there is a mismatch between the first signature variable and the second signature variable at the comparison point.

5. The system of claim 1, wherein the first work-item executes the first write operations to a local data store (LDS).

6. The system of claim 1, wherein the first work-item and the second work-item execute an identical instruction sequence and fetch an identical data.

7. The system of claim 1, wherein the processor is a compute unit.

8. The system of claim 1, wherein the processor is further configured to perform operations comprising:
    mapping the first work-item and the second work-item to an identifier.

9. A method for implementing redundant multithreading in a processor including a plurality of compute units, each compute unit including a plurality of processing elements, each of the plurality of processing elements including a respective private memory, comprising:
    executing a first work-item on a first processing element and a second work-item on a second processing element, the first and second processing elements included on the same compute unit, wherein the first work-item performs first write operations to a first signature variable in the private memory of the first processing element, the private memory of the first processing element exclusively associated with the first processing element, the first signature variable associated with one of a global or local identifier of the first work-item and the second work-item performs second write operations to a second signature variable in the private memory of the second processing element, the private memory of the second processing element exclusively associated with the second processing element, the second signature variable associated with one of a global or local identifier of the second work-item; and comparing the first signature variable to the second signature variable at a comparison point.

10. The method recited in claim 9, wherein a plurality of work-items is at least doubled.

11. The method recited in claim 9, wherein the comparing further comprises:

writing the second signature variable into a comparison point array in a local data store (LDS); and comparing the first signature variable to the comparison point array in the LDS.

12. The method recited in claim 9, further comprising:

executing a recovery operation when there is a mismatch between the first signature variable and the second signature variable at the comparison point.

13. The method recited in claim 9, wherein first work-item executes the first write operations to a local data store (LDS).

14. The method recited in claim 9, wherein the first work-item and the second work-item execute an identical instruction sequence and fetch an identical data.

15. The method recited in claim 9, further comprising:

mapping the first and the second work-item to an identifier.

16. A non-transitory computer-readable storage medium having computer-executable instructions stored thereon, execution of which, by a computing device, causes the computing device to perform operations comprising:

executing a first work-item on a first processing element and a second work-item on a second processing element, the first and second processing elements included on the same compute unit of a plurality of compute units included on a processor, wherein the first work-item performs first write operations to a first signature variable in a private memory of the first processing element, the private memory of the first processing element exclusively associated with the first processing element, the first signature variable associated with one of a global or local identifier of the first work-item and the second work-item performs second write operations to a second signature variable in a private memory of the second processing element, the private memory of the second processing element exclusively associated with the second processing element, the second signature variable associated with one of a global or local identifier of the second work-item; and comparing the first signature variable to the second signature variable at a comparison point.

17. The non-transitory computer-readable storage medium recited in claim 16, wherein a plurality of work-items is at least doubled.

18. The non-transitory computer-readable storage medium recited in claim 16, wherein the comparing further comprises:

writing the second signature variable into a comparison point array in a local data store (LDS); and comparing the first signature variable to the comparison point array in the LDS.

19. The non-transitory computer-readable storage medium recited in claim 16, further comprising:

executing a recovery operation when there is a mismatch between the first signature variable and the second signature variable at the comparison point.

20. The non-transitory computer-readable storage medium recited in claim 16, wherein the first work-item executes the first write operations to a local data store (LDS).

21. The non-transitory computer-readable storage medium recited in claim 16, wherein first work-item and the second work-item execute an identical instruction sequence and fetch an identical data.

22. The non-transitory computer-readable storage medium recited in claim 16, further comprising:

mapping the first and the second work-item to an identifier.

* * * * *